US010399454B2

(12) United States Patent
Kinoshita

(10) Patent No.: US 10,399,454 B2
(45) Date of Patent: Sep. 3, 2019

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 63 days.

(21) Appl. No.: 15/858,490

(22) Filed: Dec. 29, 2017

(65) Prior Publication Data

US 2018/0281615 A1 Oct. 4, 2018

(30) Foreign Application Priority Data

Mar. 28, 2017 (JP) .................................. 2017-063514

(51) Int. Cl.
*B60L 11/18* (2006.01)
*B60L 3/00* (2019.01)
(Continued)

(52) U.S. Cl.
CPC .......... *B60L 11/1862* (2013.01); *B60L 1/003* (2013.01); *B60L 3/0046* (2013.01); *B60L 50/64* (2019.02);
(Continued)

(58) Field of Classification Search
CPC ...... B60L 11/1862; B60L 58/13; B60L 50/64; B60L 58/22; B60L 3/0046; B60L 1/003;
(Continued)

(56) References Cited

U.S. PATENT DOCUMENTS 5,488,283 A * 1/1996 Dougherty ........ H01M 10/0413
307/10.1
2009/0096285 A1 4/2009 Acena et al.
(Continued)

FOREIGN PATENT DOCUMENTS

JP 2013-256267 A 12/2013
JP 2014-033571 A 2/2014
(Continued)

OTHER PUBLICATIONS

JPO Decision to Grant a Patent in JPA No. 2017-063514, dated Dec. 18, 2018, with English translation.
(Continued)

*Primary Examiner* — Drew A Dunn
*Assistant Examiner* — Sailesh Thapa
(74) *Attorney, Agent, or Firm* — McGinn IP Law Group, PLLC

(57) ABSTRACT

A vehicle power supply apparatus includes a motor generator, a first electricity storage device, a second electricity storage device, a switch, a switch controller, and an electricity storage device determiner. The switch controller is configured to cause the first cutoff state of the switch, switchable between a first electrically conductive state that allows the motor generator and the first electricity storage device to be coupled to each other and a first cutoff state that allows the motor generator and the first electricity storage device to be isolated from each other, to be maintained in a situation where the first electricity storage device discharges beyond a threshold, on a condition that the switch is switched to the first cutoff state in accordance with controlling of the motor generator into a powering state and the second electricity storage device is determined as being in an abnormal state.

11 Claims, 13 Drawing Sheets

(51) Int. Cl.
  *B60R 16/04* (2006.01)
  *H02J 7/34* (2006.01)
  *B60L 1/00* (2006.01)
  *B60R 16/03* (2006.01)
  *B60L 58/13* (2019.01)
  *B60L 58/22* (2019.01)
  *B60L 50/64* (2019.01)
  *H02J 7/00* (2006.01)
  *H02J 7/14* (2006.01)

(52) U.S. Cl.
  CPC .............. *B60L 58/13* (2019.02); *B60L 58/22* (2019.02); *B60R 16/03* (2013.01); *B60R 16/04* (2013.01); *H02J 7/0029* (2013.01); *H02J 7/1423* (2013.01); *H02J 7/34* (2013.01); *H02J 2007/004* (2013.01)

(58) Field of Classification Search
  CPC .......... H02J 7/0029; H02J 7/1423; H02J 7/34; H02J 2007/004; B60R 16/03; B60R 16/04
  See application file for complete search history.

(56) References Cited

U.S. PATENT DOCUMENTS

2016/0288746 A1* 10/2016 Namuduri ............. B60R 16/033
2016/0290305 A1 10/2016 Kinoshita

FOREIGN PATENT DOCUMENTS

| | | | |
|---|---|---|---|
| JP | 2014-036557 A | 2/2014 |
| JP | 2015-042510 A | 3/2015 |
| JP | 2016-194253 A | 11/2016 |
| JP | 2016-203969 A | 12/2016 |

OTHER PUBLICATIONS

Japanese Office Action, dated Sep. 11, 2018, in Japanese Application No. 2017-063514 and English Translation thereof.

* cited by examiner

VEHICLE POWER SUPPLY APPARATUS

CROSS-REFERENCE TO RELATED APPLICATIONS

The present application claims priority from Japanese Patent Application No. 2017-063514 filed on Mar. 28, 2017, the entire contents of which are hereby incorporated by reference.

BACKGROUND

The technology relates to a vehicle power supply apparatus to be mounted on a vehicle.

Various proposals have been made on a vehicle power supply apparatus to be mounted on a vehicle. For example, Japanese Unexamined Patent Application Publication (JP-A) No. 2014-36557 proposes a power supply apparatus that generates electricity by means of regeneration performed by a motor generator, such as an integrated starter generator (ISG). The power supply apparatus disclosed in JP-A No. 2014-36557 includes electricity storage devices such as batteries, i.e., a lead battery and a lithium-ion battery that are coupled in parallel to each other. This configuration allows for charging of not only the lead battery but also the lithium-ion battery by means of electric power derived from the regeneration, making it possible to increase the regeneration electric power and enhance an energy efficiency of the vehicle accordingly.

SUMMARY

Electrical loads such as actuators are coupled to respective electricity storage devices provided in a power supply apparatus. With a trend toward an increase in power consumption of the electrical loads year after year, a situation arises where, depending on a status of operation of the electrical loads coupled to the respective electricity storage devices, a certain electricity storage device among them may possibly experience excessive discharge. In such a situation where the excessive discharge of the electricity storage device occurs, one possible measure to avoid the excessive discharge may be to control a switch provided in a power supply circuit to couple the plurality of electricity storage devices to each other.

Under circumstances where the electrical loads are coupled to the respective electricity storage devices, however, coupling other electricity storage devices in order to protect the certain electricity storage device is equivalent to coupling new electrical loads to the electricity storage device to be protected. This may possibly result in further discharge of the electricity storage device to be protected depending on a status of operation of the new electrical loads to be coupled to the electricity storage device to be protected. What is desired is to achieve an appropriate protection of the electricity storage device.

It is desirable to provide a vehicle power supply apparatus that makes it possible to protect an electricity storage device.

An aspect of the technology provides a vehicle power supply apparatus to be mounted on a vehicle that includes an engine. The vehicle power supply apparatus includes: a motor generator coupled to the engine; a first electricity storage device able to be coupled to the motor generator; a second electricity storage device able to be coupled to the motor generator in parallel to the first electricity storage device; a switch switchable between a first electrically conductive state that allows the motor generator and the first electricity storage device to be coupled to each other and a first cutoff state that allows the motor generator and the first electricity storage device to be isolated from each other; a switch controller configured to cause the switch to be switched from the first electrically conductive state to the first cutoff state when the motor generator is controlled into a powering state; and an electricity storage device determiner configured to determine whether the second electricity storage device is in a normal state in which the second electricity storage device is able to discharge normally or in an abnormal state in which the second electricity storage device is unable to discharge normally. The switch controller causes the switch to be switched from the first cutoff state to the first electrically conductive state in a situation where the first electricity storage device discharges beyond a threshold, on a condition that the switch is switched to the first cutoff state in accordance with the controlling of the motor generator into the powering state and the second electricity storage device is determined by the electricity storage device determiner as being in the normal state, and the switch controller causes the first cutoff state of the switch to be maintained in the situation where the first electricity storage device discharges beyond the threshold, on a condition that the switch is switched to the first cutoff state in accordance with the controlling of the motor generator into the powering state and the second electricity storage device is determined by the electricity storage device determiner as being in the abnormal state.

An aspect of the technology provides a vehicle power supply apparatus to be mounted on a vehicle that includes an engine. The vehicle power supply apparatus includes: a motor generator coupled to the engine; a first electricity storage device able to be coupled to the motor generator; a second electricity storage device able to be coupled to the motor generator in parallel to the first electricity storage device; a switch switchable between a first electrically conductive state that allows the motor generator and the first electricity storage device to be coupled to each other and a first cutoff state that allows the motor generator and the first electricity storage device to be isolated from each other; and circuitry configured to cause the switch to be switched from the first electrically conductive state to the first cutoff state when the motor generator is controlled into a powering state, determine whether the second electricity storage device is in a normal state in which the second electricity storage device is able to discharge normally or in an abnormal state in which the second electricity storage device is unable to discharge normally, cause the switch to be switched from the first cutoff state to the first electrically conductive state in a situation where the first electricity storage device discharges beyond a threshold, on a condition that the switch is switched to the first cutoff state in accordance with the controlling of the motor generator into the powering state and the second electricity storage device is determined as being in the normal state, and cause the first cutoff state of the switch to be maintained in the situation where the first electricity storage device discharges beyond the threshold, on a condition that the switch is switched to the first cutoff state in accordance with the controlling of the motor generator into the powering state and the second electricity storage device is determined as being in the abnormal state.

DETAILED DESCRIPTION

Figure 1:
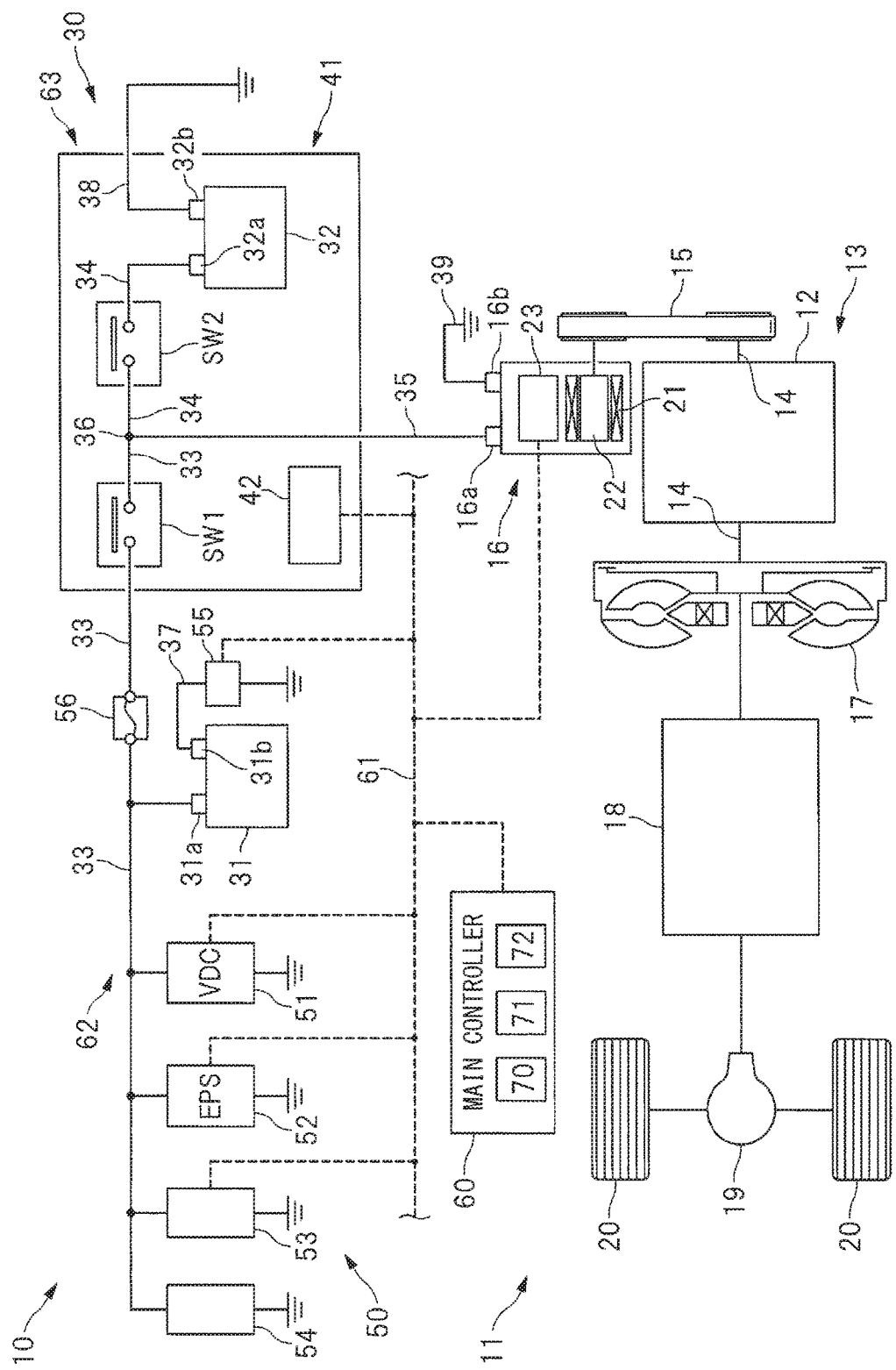
FIG. 1 schematically illustrates an example of a configuration of a vehicle provided with a vehicle power supply apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 is a schematic diagram illustrating an example of a configuration of a vehicle 11 provided with a vehicle power supply apparatus 10 according to an example implementation of the technology. Referring to FIG. 1, the vehicle 11 may be mounted with a power unit 13. The power unit 13 may include an engine 12 that serves as a power source. The engine 12 may include a crankshaft 14 that is mechanically coupled to a starter generator 16 via a belt mechanism 15. In one implementation, the starter generator 16 may serve as a "motor generator". The engine 12 may also be coupled to a transmission mechanism 18 via a torque converter 17. The transmission mechanism 18 may be coupled to wheels 20 via a member such as a differential mechanism 19.

The starter generator 16 coupled to the engine 12 may be a so-called integrated starter generator (ISG) that serves both as an electric generator and an electric motor. The starter generator 16 may serve not only the electric generator to be driven by the crankshaft 14 but may also serve as the electric motor that revolves the crankshaft 14. For example, the starter generator 16 may be controlled into a powering state as the electric motor when restarting the engine 12 upon an idling stop control, or when assisting the engine 12 upon start and acceleration. The starter generator 16 may include a stator 21 having a stator coil and a rotor 22 having a field coil. The starter generator 16 may further include an ISG controller 23 in order to control an electrically conductive state of each of the stator coil and the field coil. The ISG controller 23 may include components such as an inverter, a regulator, and a microcomputer. The ISG controller 23 may control the electrically conductive state of each of the field coil and the stator coil, thus controlling torque upon electric power generation, torque upon powering, or any other factor, of the starter generator 16.

[Power Supply Circuit]

Figure 2:
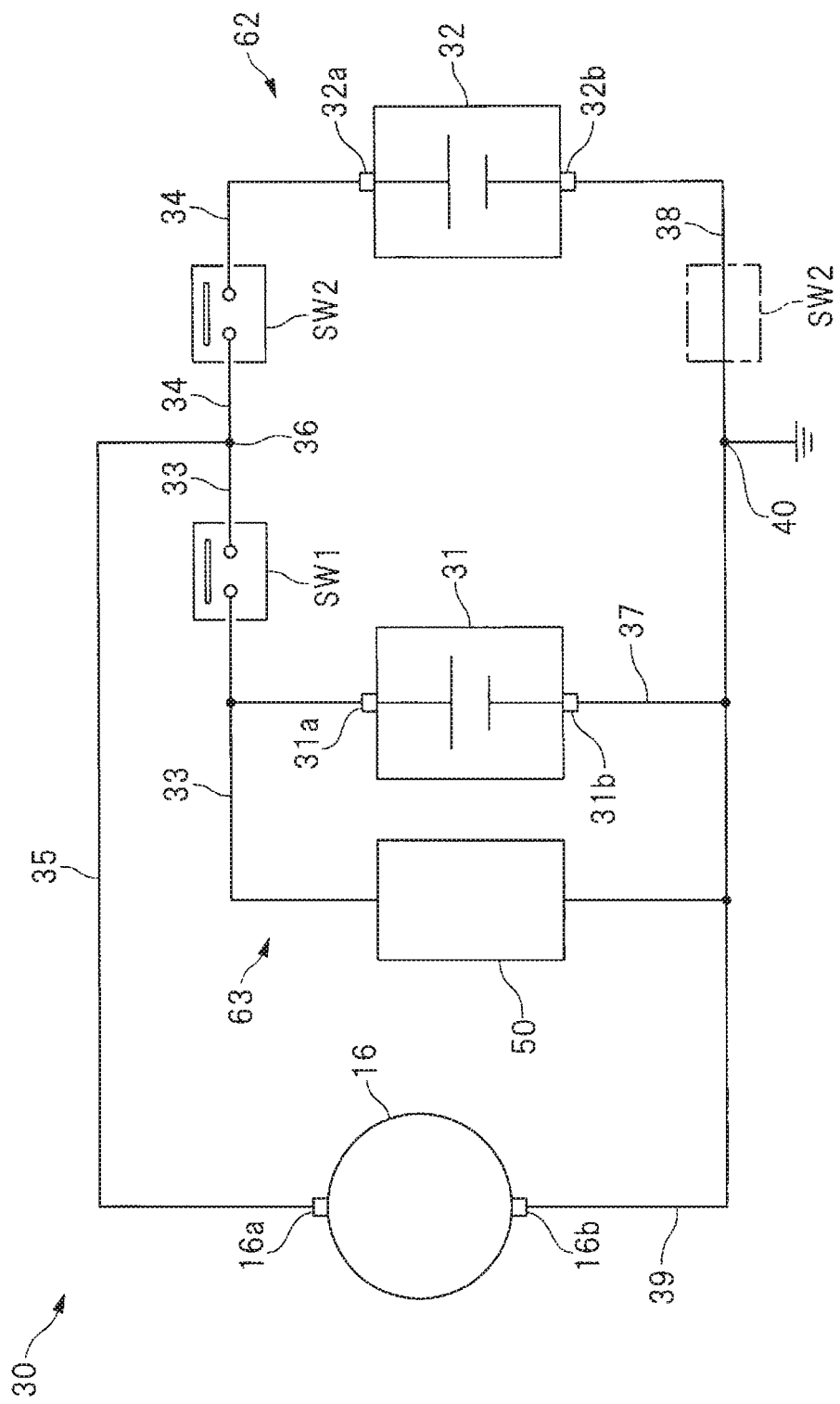
FIG. 2 is a circuit diagram illustrating an example of a power supply circuit.

A description is given of a power supply circuit 30 included in the vehicle power supply apparatus 10. FIG. 2 is a circuit diagram illustrating an example of the power supply circuit 30. Referring to FIG. 2, the power supply circuit 30 may include a lead battery 31 and a lithium-ion battery 32. In one implementation, the lead battery 31 may serve as a "first electricity storage device". In one implementation, the lithium-ion battery 32 may serve as a "second electricity storage device". The lead battery 31 may be configured to be electrically coupled to the starter generator 16. The lithium-ion battery 32 may be configured to be electrically coupled to the starter generator 16 in parallel to the lead battery 31. The lithium-ion battery 32 may have a terminal voltage that is designed higher than a terminal voltage of the lead battery 31 in order to actively discharge the lithium-ion battery 32. Further, the lithium-ion battery 32 may have internal resistance that is designed smaller than internal resistance of the lead battery 31 in order to actively charge and discharge the lithium-ion battery 32.

The lead battery 31 may include a positive electrode terminal 31a coupled to a positive electrode line 33. The lithium-ion battery 32 may include a positive electrode terminal 32a coupled to a positive electrode line 34. The starter generator 16 may include a positive electrode terminal 16a coupled to a positive electrode line 35. These positive electrode lines 33 to 35 may be coupled to one another via a node 36. The lead battery 31 may include a negative electrode terminal 31b coupled to a negative electrode line 37. The lithium-ion battery 32 may include a negative electrode terminal 32b coupled to a negative electrode line 38. The starter generator 16 may include a negative electrode terminal 16b coupled to a negative electrode line 39. These negative electrode lines 37 to 39 each may be coupled to a reference potential point 40.

The positive electrode line 33 of the lead battery 31 may be provided with a switch SW1. In one implementation, the switch SW1 may serve as a "switch" or a "first switch". The switch SW1 may be switched between an electrically conductive state and a cutoff state. Switching the switch SW1 to the electrically conductive state may allow the starter generator 16 and the lead battery 31 to be coupled to each other, whereas switching the switch SW1 to the cutoff state may allow the starter generator 16 and the lead battery 31 to be isolated from each other. Further, the positive electrode line 34 of the lithium-ion battery 32 may be provided with a switch SW2. In one implementation, the switch SW2 may serve as a "second switch". The switch SW2 may be switched between an electrically conductive state and a cutoff state. Switching the switch SW2 to the electrically conductive state may allow the starter generator 16 and the lithium-ion battery 32 to be coupled to each other, whereas switching the switch SW2 to the cutoff state may allow the starter generator 16 and the lithium-ion battery 32 to be isolated from each other. The switch SW1 and the switch SW2 each may be configured by a semiconductor element such as, but not limited to, a metal-oxide-semiconductor field-effect transistor (MOSFET). In an alternative implementation, the switch SW1 and the switch SW2 each may be a mechanical switch that opens and closes a contact by means of electromagnetic force, for example. Note that the switch SW1 and the switch SW2 are each referred to as a relay or a contact as well, for example.

Referring to FIG. 1, the power supply circuit 30 may include a battery module 41. The lithium-ion battery 32 and the switches SW1 and SW2 may be incorporated into the battery module 41. The battery module 41 may further include the battery controller 42. The battery controller 42 may include a microcomputer, for example. The battery controller 42 may have a monitoring function and a control function. Non-limiting examples of the monitoring function may include monitoring of a state of charge SOC, charge and discharge currents, a terminal voltage, and a cell temperature of the lithium-ion battery 32. Non-limiting examples of the control function may include controlling the switching of each of the switches SW1 and SW2.

The positive electrode line 33 of the lead battery 31 may be coupled to an electrical load group 50 including a plurality of electrical loads. Non-limiting examples of the electrical load that configures the electrical load group 50 may include: an antiskid brake system 51 that stabilizes traveling attitude of the vehicle 11; an electric power steering device 52 that assists a steering operation performed by a driver; headlights 53 that apply light toward the front of the vehicle 11; and an instrument panel 54 that displays various pieces of information to an occupant. Among the electrical loads exemplified above, the antiskid brake system 51, the electric power steering device 52, and the headlights 53 each may be a large-capacity device whose power consumption exceeds a predetermined electric power threshold. In one implementation, the large-capacity device may serve as a "large-capacity load". Note that the large-capacity device having the large power consumption is not limited to each of the devices described above. Non-limiting examples of a device equivalent to the large-capacity device may include a heater blower, a positive temperature coefficient (PTC) heater, and an electric heater.

Although unillustrated, the positive electrode line 33 of the lead battery 31 may also be coupled to various controllers as the electrical loads, including an ISG controller 23, a battery controller 42, and a later-described main controller 60. In other words, in an example implementation, the various controllers including the ISG controller 23, the battery controller 42, and the main controller 60 each may be provided as one of the electrical loads that configure the electrical load group 50. Further, the negative electrode line 37 of the lead battery 31 may be provided with a battery sensor 55. The battery sensor 55 may have a detection function. Non-limiting examples of the detection function may include detection of a state of charge SOC, charge and discharge currents, and a terminal voltage of the lead battery 31. The positive electrode line 33 may also be provided with a fuse 56 that protects the electrical load group 50 and other devices.

[Charge-Discharge Control of Battery]

A description is given of a charge-discharge control of the lithium-ion battery 32. In order to control the charge and the discharge of the lithium-ion battery 32, the vehicle power supply apparatus 10 may be provided with the main controller 60. The main controller 60 may include a microcomputer, for example. The main controller 60 and other controllers including the ISG controller 23 and the battery controller 42 may be so coupled to one another as to be able to perform a communication mutually and freely via an in-vehicle network 61. Non-limiting examples of the in-vehicle network 61 may include a controller area network (CAN) and a local interconnect network (LIN). The main controller 60 may control the charge and the discharge of the lithium-ion battery 32 by controlling the starter generator 16 into a power-generation state or a power-generation suspended state on the basis of the state of charge SOC of the lithium-ion battery 32. Note that the state of charge SOC refers to a ratio of an electricity storage amount of the battery to a designed capacity of the battery. The state of charge SOC may be transmitted from the battery controller 42 to the main controller 60.

Figure 3:
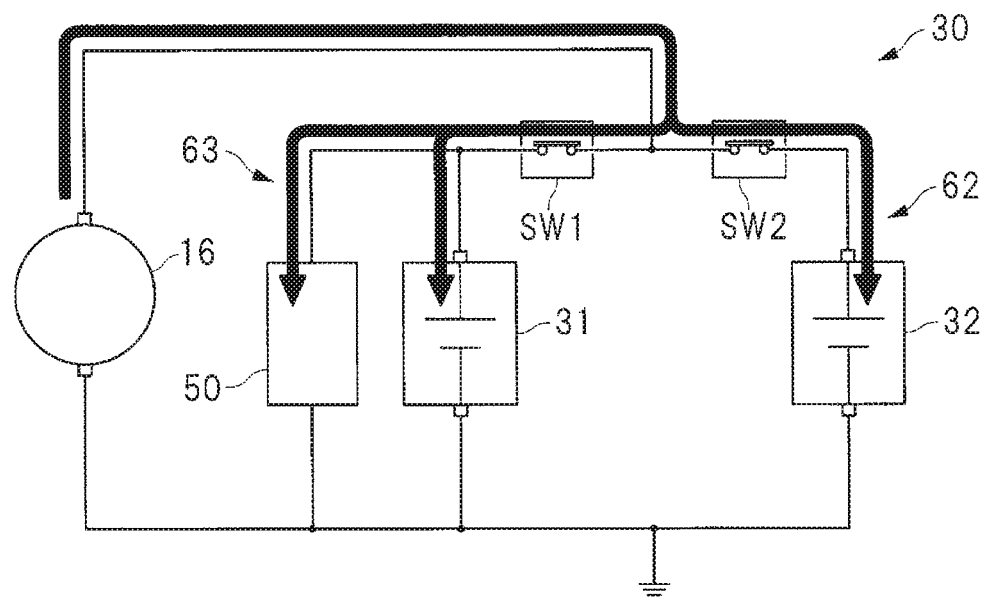
FIG. 3 describes an example of an electric power supply situation when a starter generator is controlled into a power-generation state.
Figure 4:
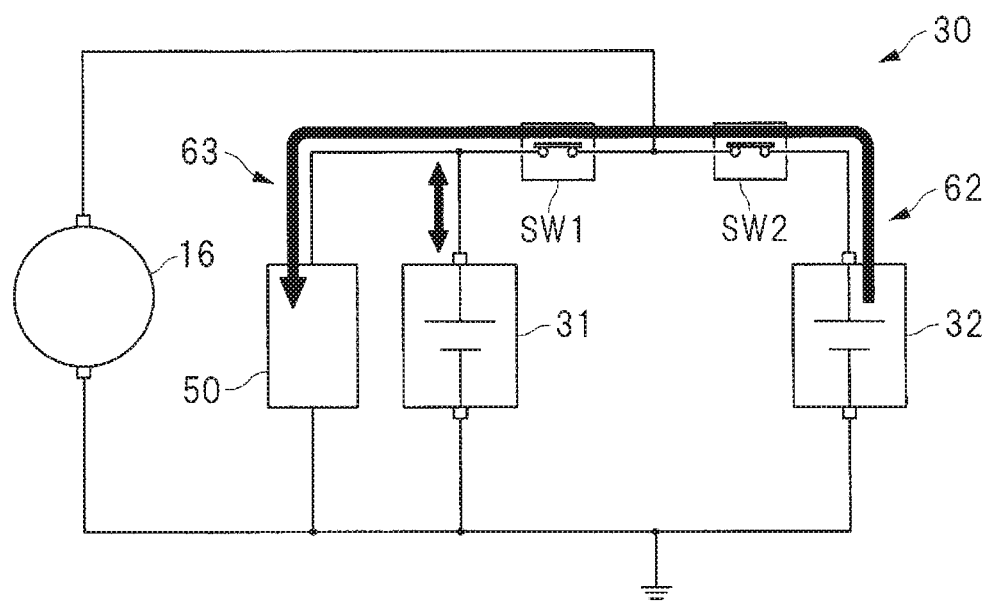
FIG. 4 describes an example of an electric power supply situation when the starter generator is controlled into a power-generation suspended state.

FIG. 3 describes an example of an electric power supply situation when the starter generator 16 is controlled into the power-generation state. FIG. 4 describes an example of an electric power supply situation when the starter generator 16 is controlled into the power-generation suspended state. The power-generation state of the starter generator 16 may include a combustion power-generation state in which the starter generator 16 is driven and revolved by means of power derived from the engine 12 and a regenerative power-generation state in which the starter generator 16 is driven and revolved by means of kinetic energy generated upon deceleration of the vehicle 11.

Referring to FIG. 3, the starter generator 16 may be controlled into the combustion power-generation state when, for example, an amount of charge of the lithium-ion battery 32 is few. In other words, in an example case where the state of charge SOC of the lithium-ion battery 32 falls below a predetermined lower limit, the starter generator 16 may be controlled into the combustion power-generation state, in order to charge the lithium-ion battery 32 for enhancement of the state of charge SOC. When the starter generator 16 is controlled into the combustion power-generation state, an electric power-generation voltage of the starter generator 16 may be raised above the terminal voltage of the lithium-ion battery 32. This causes the starter generator 16 to supply generated electric power to components such as the lithium-ion battery 32, the electrical load group 50, and the lead battery 31, as indicated by black arrows in FIG. 3. Hence, the lithium-ion battery 32 is charged by the starter generator 16.

Referring to FIG. 4, the starter generator 16 may be controlled into the power-generation suspended state when, for example, an amount of charge of the lithium-ion battery 32 is sufficiently ensured. In other words, in an example case where the state of charge SOC of the lithium-ion battery 32 exceeds a predetermined upper limit, the starter generator 16 may be controlled into the power-generation suspended state, in order to facilitate the discharge of the lithium-ion battery 32 for reduction in an engine load. When the starter generator 16 is controlled into the power-generation suspended state, the electric power-generation voltage of the starter generator 16 may be lowered below the terminal voltage of the lithium-ion battery 32. This causes electric power to be supplied to the electrical load group 50 from the lithium-ion battery 32, as indicated by a black arrow in FIG. 4. Therefore, it becomes possible to suppress the electric power generation of the starter generator 16, thus allowing for reduction in the engine load.

As described above, the starter generator 16 may be controlled into the state such as the combustion power-generation state and the power-generation suspended state on the basis of the state of charge SOC. In order to enhance a fuel consumption performance of the vehicle 11, the starter generator 16 may be controlled into the regenerative power-generation state upon the deceleration of the vehicle 11. This makes it possible to convert the kinetic energy of the vehicle 11 into electric energy and collect the converted electric energy, thus making it possible to enhance an energy efficiency of the vehicle 11. Whether to execute the power generation by means of the regeneration performed by the starter generator 16 may be determined on the basis of a factor such as a state of operation of an accelerator pedal and a state of operation of a brake pedal. For example, when the accelerator pedal that has been pressed down is released upon the traveling of the vehicle 11, or when the brake pedal is pressed down upon the traveling of the vehicle 11, the electric power-generation voltage of the starter generator 16 may be raised above the terminal voltage of the lithium-ion battery 32 and the starter generator 16 may be controlled into the regenerative power-generation state as illustrated in FIG. 3. Note that, when the starter generator 16 is controlled into the combustion power-generation state, the regenerative power-generation state, or the power-generation suspended state, the switch SW1 and the switch SW2 may be held in the electrically conductive state as illustrated in FIGS. 3 and 4.

[Battery Protection Control]

Figure 5:
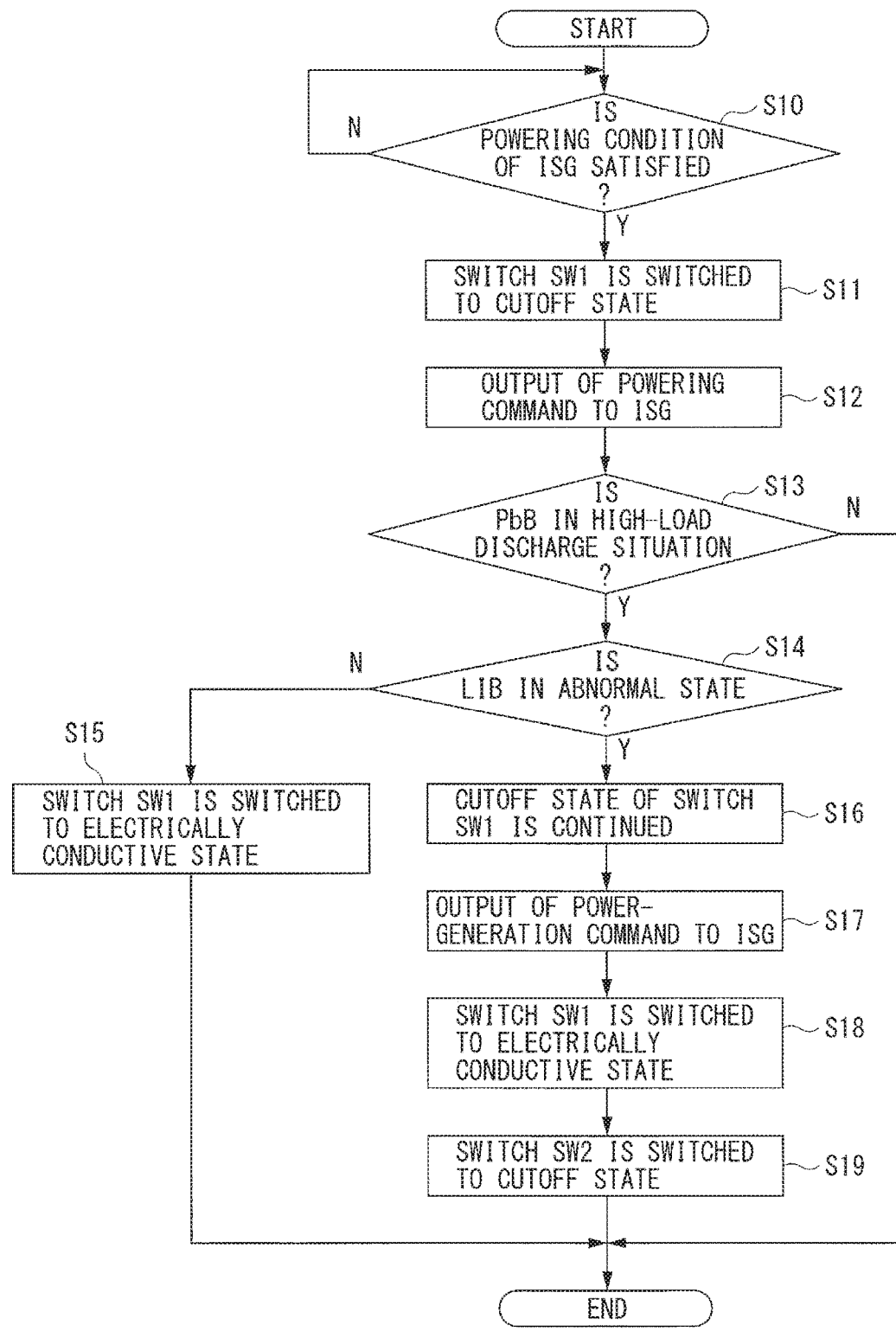
FIG. 5 is a flowchart illustrating an example of a procedure for execution of a battery protection control.
Figure 6:
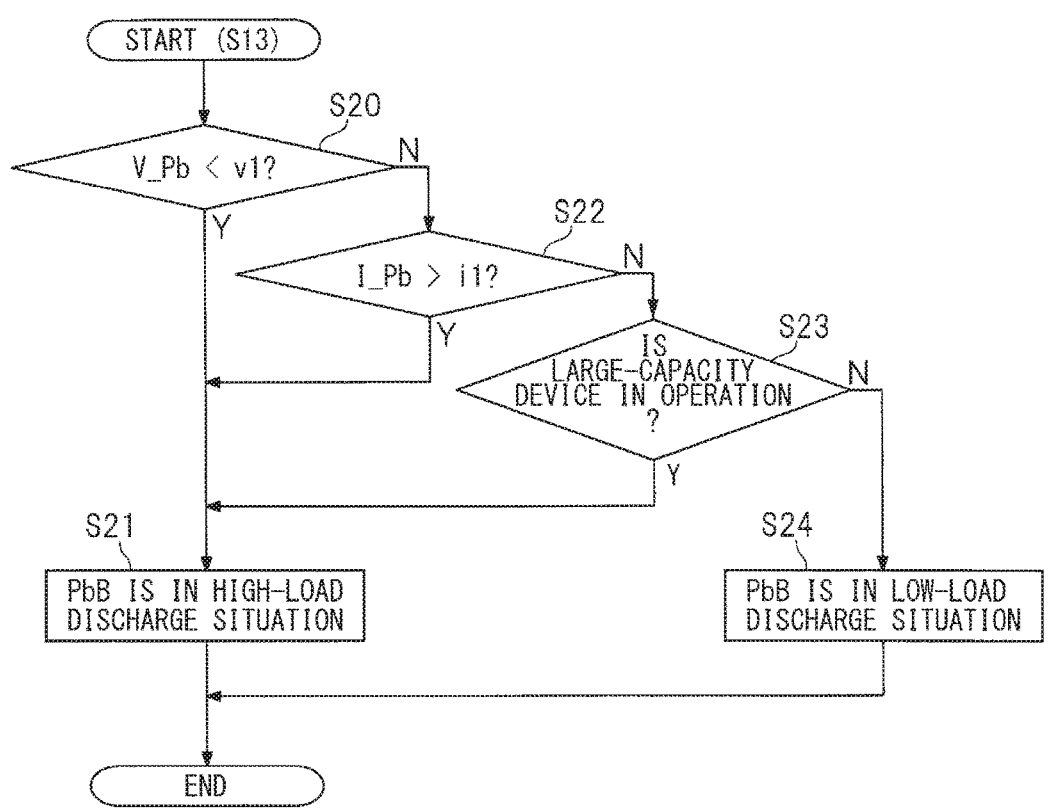
FIG. 6 is a flowchart illustrating an example of a detailed procedure for execution of step S13 of FIG. 5.
Figure 7:
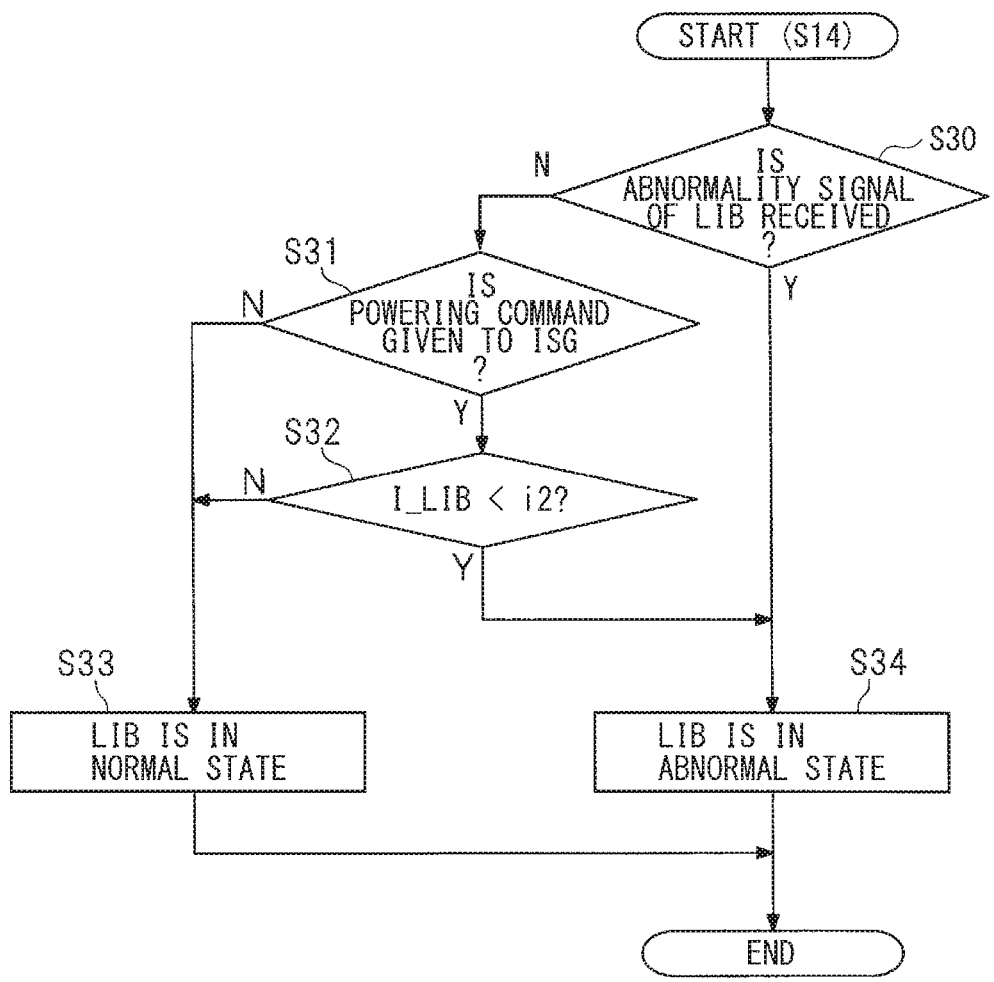
FIG. 7 is a flowchart illustrating an example of a detailed procedure for execution of step S14 of FIG. 5.

A description is given next of a battery protection control that protects the lead battery 31 according to an example implementation. The battery protection control may be performed by the main controller 60 at every predetermined cycle. FIG. 5 is a flowchart illustrating an example of a procedure for execution of the battery protection control. FIG. 6 is a flowchart illustrating an example of a detailed procedure for execution of step S13 of FIG. 5. FIG. 7 is a flowchart illustrating an example of a detailed procedure for execution of step S14 of FIG. 5. FIGS. 8 to 13 each describe an example of an electric power supply situation in a corresponding course of the battery protection control. Note that ON and OFF illustrated in FIGS. 5 to 13 respectively denote the electrically conductive state and the cutoff state of the corresponding switch SW1 or SW2. Further, in FIGS. 5 to 7, "ISG", "PbB", and "LIB" respectively denote the starter generator 16, the lead battery 31, and the lithium-ion battery 32.

Referring to FIG. 1, the main controller 60 that controls the ISG controller 23 and the battery controller 42 in an overall fashion may include units such as a switch controller 70, a battery determiner 71, and a motor controller 72. The switch controller 70 of the main controller 60 may set an operation target value of each of the switches SW1 and SW2 on the basis of an operation state of each of the starter generator 16, the lead battery 31, and the lithium-ion battery 32, and may output a control signal corresponding to the thus-set operation target value to the battery controller 42. The battery determiner 71 of the main controller 60 may determine, on the basis of the operation state of the starter generator 16, the lithium-ion battery 32, or both, whether the lithium-ion battery 32 is in a normal state in which the lithium-ion battery 32 is able to discharge normally. In one implementation, the battery determiner 71 may serve as an "electricity storage device determiner". The motor controller 72 of the main controller 60 may set an operation target value of the starter generator 16 on the basis of the operation state of one or more of the switch SW1, the switch SW2, and the starter generator 16, and may output a control signal corresponding to the thus-set operation target value to the ISG controller 23.

Referring to FIG. 5, in step S10, a determination may be made as to whether a powering condition of the starter generator 16 is satisfied. A situation in which the powering condition of the starter generator 16 is satisfied may be, for example, where the engine 12 is to be started and revolved by the starter generator 16 upon starting of the engine 12, or where the engine 12 is to be driven and assisted by the starter generator 16 upon the start or the acceleration of the vehicle 11. When the determination is made in step S10 that the powering condition of the starter generator 16 is satisfied (S10: Y), the flow may proceed to step S11 in which the switch SW1 may be switched from the electrically conductive state to the cutoff state. Thereafter, in step S12, a powering command may be outputted to the ISG controller 23 and the starter generator 16 may be controlled into the powering state accordingly.

Figure 8:
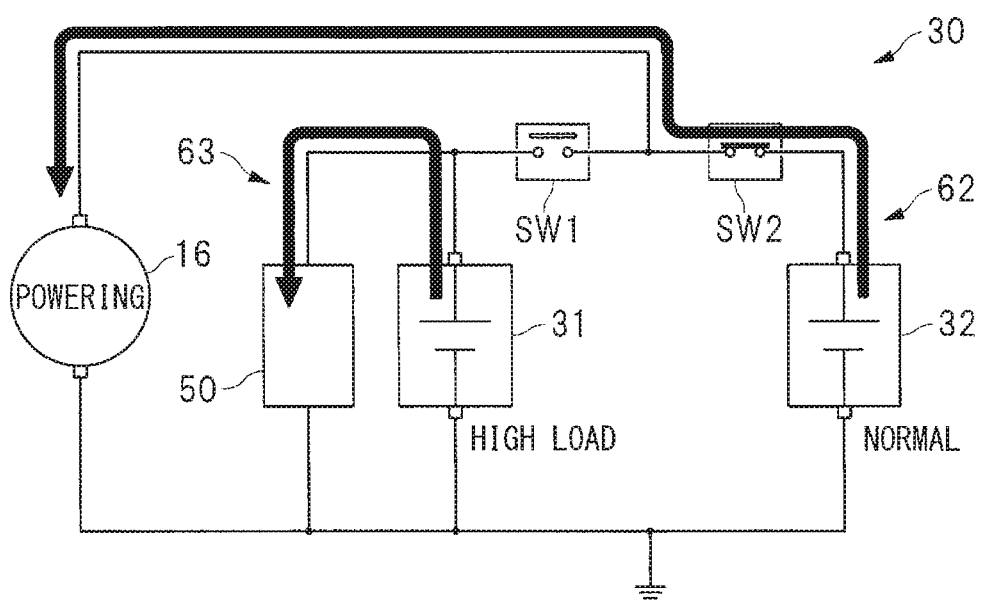
FIG. 8 describes an example of an electric power supply situation in a course of the battery protection control.

In this way, the switch SW1 may be switched from the electrically conductive state to the cutoff state upon controlling the starter generator 16 into the powering state. Referring to FIG. 8, switching the switch SW1 to the cutoff state causes a power supply circuit 62, including the lithium-ion battery 32 and the starter generator 16, and a power supply circuit 63, including the lead battery 31 and the electrical load group 50, to be isolated from each other. Thus, as indicated by black arrows in FIG. 8, it is possible to supply the electric power to the electrical load group 50 from the lead battery 31 while preventing the supply of power from the lead battery 31 to the starter generator 16, even in a situation where power consumption of the starter generator 16 increases. This makes it possible to prevent instantaneous voltage drop for the electrical load group 50, and thereby to control the vehicle 11 without giving the occupant a feeling of strangeness.

Referring back to FIG. 5, the flow may proceed to step S13 after the powering command is outputted to the starter generator 16 in step S12. In step S13, a determination may be made as to whether a situation of the discharge of the lead battery 31 is a high-load discharge situation. A description is given now, in accordance with the example flowchart illustrated in FIG. 6, of a procedure for a determination as to whether the situation of the discharge of the lead battery 31 is the high-load discharge situation.

Referring to FIG. 6, upon determining whether the situation of the discharge of the lead battery 31 is the high-load discharge situation, a determination may be made in step S20 as to whether a terminal voltage V_Pb of the lead battery 31 is less than a predetermined voltage threshold v1. A flow may proceed to step S21 when the determination is made in step S20 that the terminal voltage V_Pb is less than the voltage threshold v1 (step S20: Y). In step S21, the situation of the discharge of the lead battery 31 may be determined as being the high-load discharge situation. In other words, in step S21, the situation of the discharge of the lead battery 31 may be determined as being a situation in which the lead battery 31 discharges beyond a predetermined threshold.

When the determination is made in step S20 that the terminal voltage V_Pb of the lead battery 31 is equal to or greater than the voltage threshold v1 (step S20: N), the flow may proceed to step S22. In step S22, a determination may be made as to whether a discharge current I_Pb of the lead battery 31 is greater than a predetermined current threshold i1. The flow may proceed to step S21 when the determination is made in step S22 that the discharge current I_Pb is greater than the current threshold i1 (step S22: Y). In step S21, the situation of the discharge of the lead battery 31 may be determined as being the high-load discharge situation, i.e., may be determined as being the situation in which the lead battery 31 discharges beyond the predetermined threshold.

When the determination is made in step S22 that the discharge current I_Pb of the lead battery 31 is equal to or less than the current threshold i1 (step S22: N), the flow may proceed to step S23. In step S23, a determination may be made as to whether one or more of the large-capacity devices each having the large power consumption, such as the antiskid brake system 51, the electric power steering device 52, and the headlights 53, is in operation. The flow may proceed to step S21 when the determination is made in step S23 that at least one of the large-capacity devices 51 to 53 is in operation (step S23: Y). In step S21, the situation of the discharge of the lead battery 31 may be determined as being the high-load discharge situation, i.e., may be determined as being the situation in which the lead battery 31 discharges beyond the predetermined threshold.

When the determination is made in step S23 that none of the large-capacity devices 51 to 53 is in operation (step S23: N), the flow may proceed to step S24. In step S24, the situation of the discharge of the lead battery 31 may be determined as being a low-load discharge situation, i.e., may be determined as being a situation in which the lead battery 31 discharges below the predetermined threshold. In other words, in an example implementation, the situation of the discharge of the lead battery 31 may be determined as being the low-load discharge situation on a condition that the terminal voltage V_Pb of the lead battery 31 is determined as being equal to or greater than the voltage threshold v1, the discharge current I_Pb of the lead battery 31 is determined as being equal to or less than the current threshold i1, and none of the large-capacity devices 51 to 53 is determined as being in operation.

Referring back to FIG. 5, the flow may proceed to step S14 when the situation of the discharge of the lead battery 31 is determined as being the high-load discharge situation in accordance with the example procedure described above. In step S14, a determination may be made as to whether the lithium-ion battery 32 is in an abnormal state in which the lithium-ion battery 32 is unable to discharge normally. A description is given now, in accordance with the example flowchart illustrated in FIG. 7, of a procedure for a determination as to whether the lithium-ion battery 32 is in the abnormal state.

Referring to FIG. 7, upon determining whether the lithium-ion battery 32 is in the abnormal state, a determination may be made in step S30 as to whether the main controller 60 has received an abnormality signal indicating that the lithium-ion battery 32 is in the abnormal state. The battery controller 42 may determine that the lithium-ion battery 32 is in a normal state in which the lithium-ion battery 32 is able to discharge normally when the internal resistance of the lithium-ion battery 32 falls below a predetermined resistance threshold, and may determine that the lithium-ion battery 32 is in the abnormal state in which the lithium-ion battery 32 is unable to discharge normally when the internal resistance of the lithium-ion battery 32 exceeds the predetermined resistance threshold. The battery controller 42 may also determine that the lithium-ion battery 32 is in the normal state in which the lithium-ion battery 32 is able to discharge normally when the state of charge SOC of the lithium-ion battery 32 exceeds a predetermined electricity storage threshold, and may also determine that the lithium-ion battery 32 is in the abnormal state in which the lithium-ion battery 32 is unable to discharge normally when the state of charge SOC of the lithium-ion battery 32 falls below the predetermined electricity storage threshold. In other words, in an example implementation, the lithium-ion battery 32 may be determined by the battery controller 42 as being in the abnormal state when the internal resistance of the lithium-ion battery 32 exceeds the predetermined resistance threshold, or when the state of charge SOC of the lithium-ion battery 32 falls below the predetermined electricity storage threshold. Thereafter, the battery controller 42 may transmit, to the main controller 60, the abnormality signal indicating that the lithium-ion battery 32 is in the abnormal state. In one implementation, the battery controller 42 may serve as the "electricity storage device determiner".

When the determination is made in step S30 that the main controller 60 has not received the abnormality signal (step S30: N), a flow may proceed to step S31. In step S31, a determination may be made as to whether the powering command has been outputted to the starter generator 16. The flow may proceed to step S32 when the determination is made in step S31 that the powering command has been outputted to the starter generator 16 (step S31: Y). In step S32, a determination may be made as to whether a discharge current I_LIB of the lithium-ion battery 32 is less than a predetermined current threshold i2. A situation in which the discharge current I_LIB of the lithium-ion battery 32 is determined as being equal to or greater than the current threshold i2 in step S32 is where a sufficient current is supplied from the lithium-ion battery 32 with a powering control of the starter generator 16 being performed. Hence, when the determination is made in step S32 that the discharge current I_LIB of the lithium-ion battery 32 is equal to or greater than the current threshold i2 (step S32: N), the flow may proceed to step S33 in which the lithium-ion battery 32 is determined as being in the normal state.

A situation in which the discharge current I_LIB of the lithium-ion battery 32 is determined as being less than the current threshold i2 in step S32 is where the sufficient current is not supplied from the lithium-ion battery 32 with the powering control of the starter generator 16 being performed. Hence, when the determination is made in step S32 that the discharge current I_LIB of the lithium-ion battery 32 is less than the current threshold i2 (step S32: Y), the flow may proceed to step S34 in which the lithium-ion battery 32 is determined as being in the abnormal state. Note that the flow may also proceed to step S34 in which the lithium-ion battery 32 is determined as being in the abnormal state when the determination is made in step S30 that the main controller 60 has received the abnormality signal (step S30: Y).

Referring back to FIG. 5, the flow may proceed to step S15 when the lithium-ion battery 32 is determined as being in the normal state in accordance with the example procedure described above (step S14: N). In step S15, the switch SW1 may be switched from the cutoff state to the electrically conductive state. In this way, in an example implementation, the switch SW1 may be switched from the cutoff state to the electrically conductive state on a condition that the situation of the discharge of the lead battery 31 is determined as being the high-load discharge situation and the lithium-ion battery 32 is determined as being in the normal state.

Figure 9:
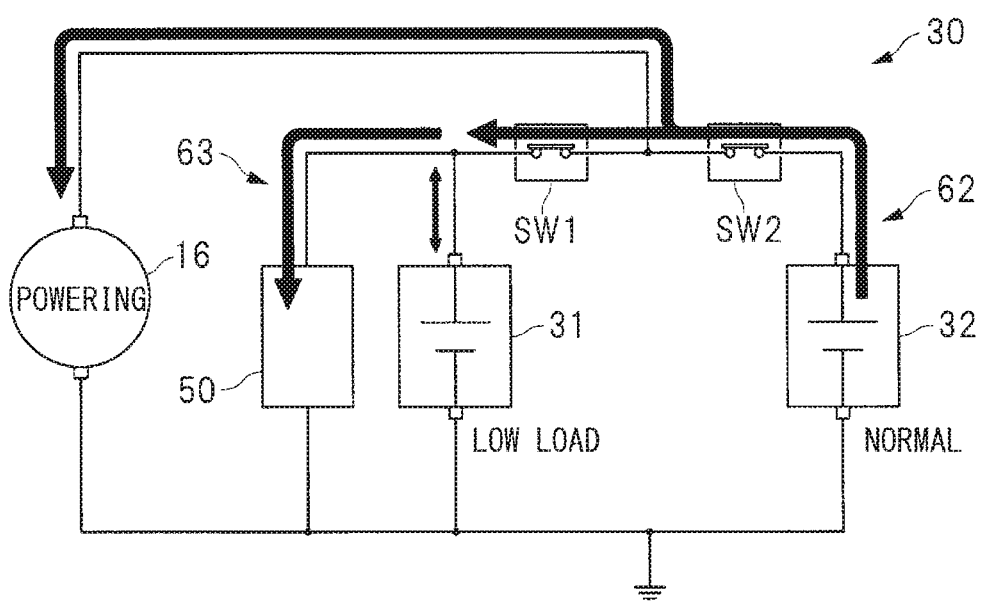
FIG. 9 describes an example of an electric power supply situation in a course of the battery protection control.

It is to be noted that a situation in which the lead battery 31 is in the high-load discharge situation with the switch SW1 being cutoff is where the electric power to be supplied from the lead battery 31 to the electrical load group 50 increases. Hence, the switch SW1 may be switched from the cutoff state to the electrically conductive state to couple the lithium-ion battery 32 to the electrical load group 50 as illustrated in FIG. 9. Thus, it is possible to supply the electric power to the electrical load group 50 from the lithium-ion battery 32 as indicated by black arrows in FIG. 9, making it possible to prevent excessive discharge of the lead battery 31 and thereby protect the lead battery 31. This also makes it possible to stabilize a power supply voltage of the vehicle power supply apparatus 10 and thereby allow the electrical load group 50 to function normally.

Figure 10:
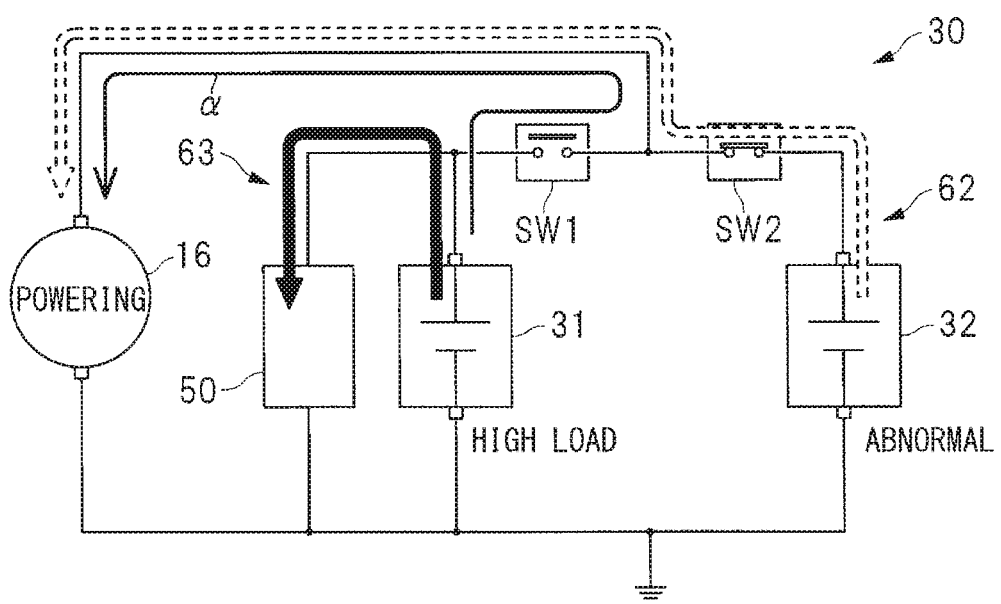
FIG. 10 describes an example of an electric power supply situation in a course of the battery protection control.

Referring back to FIG. 5, the flow may proceed to step S16 when the determination is made in step S14 that the lithium-ion battery 32 is in the abnormal state in which the lithium-ion battery 32 is unable to discharge normally (step S14: Y). In step S16, the cutoff state of the switch SW1 may be continued. A situation in which the lithium-ion battery 32 is determined as being in the abnormal state is where the sufficient current is not supplied to the starter generator 16 from the lithium-ion battery 32 even though the powering command has been outputted to the starter generator 16 as illustrated in FIG. 10. In other words, as denoted by an arrow a, switching the switch SW1 to the electrically conductive state in the situation illustrated in FIG. 10 causes the electric power to be supplied from the lead battery 31 to the starter generator 16 to which the powering command is given, possibly leading to the excessive discharge of the lead battery 31. Hence, referring back to FIG. 5, the flow may proceed to step S16 to continue the cutoff state of the switch SW1 when the lithium-ion battery 32 is determined as being in the abnormal state in step S14 (step S14: Y). Thus, it is possible to avoid the coupling of the lead battery 31 to the starter generator 16 to which the powering command is given as illustrated in FIG. 10, making it possible to prevent the excessive discharge of the lead battery 31 and thereby protect the lead battery 31.

Referring back to FIG. 5, the flow may proceed to step S17 when the cutoff state of the switch SW1 is continued in step S16. In step S17, a power-generation command may be outputted to the starter generator 16 to control the starter generator 16 into the power-generation state. Thereafter, the flow may proceed to step S18 in which the switch SW1 is switched from the cutoff state to the electrically conductive state, following which the flow may proceed to step S19 in which the switch SW2 may be switched from the electrically conductive state to the cutoff state.

Figure 11:
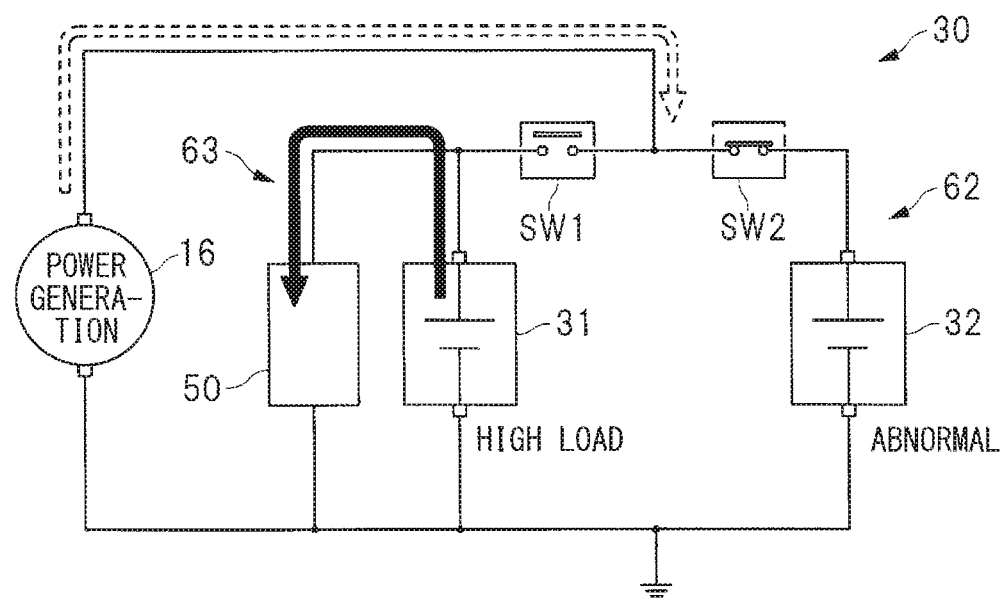
FIG. 11 describes an example of an electric power supply situation in a course of the battery protection control.
Figure 12:
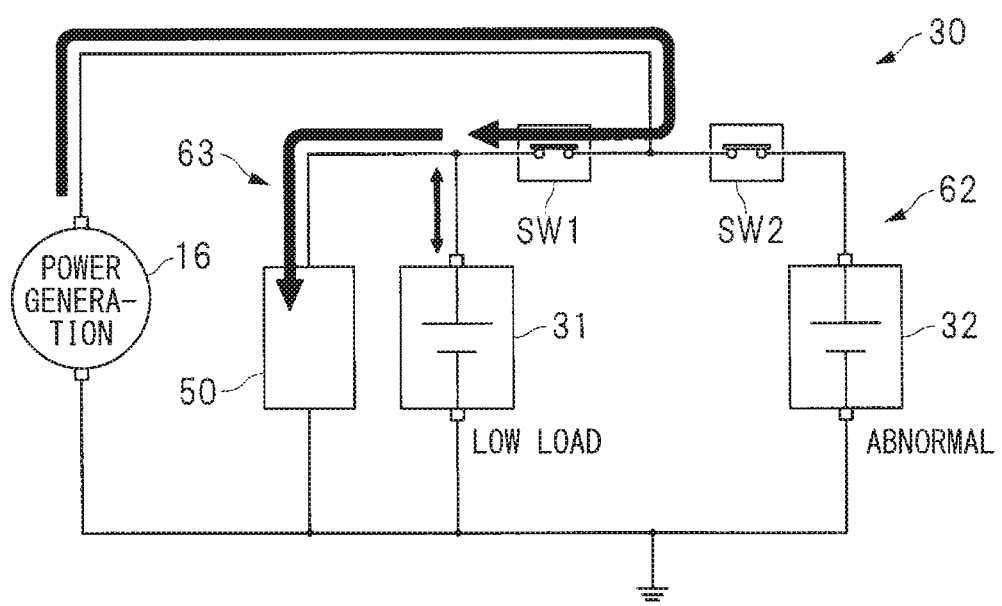
FIG. 12 describes an example of an electric power supply situation in a course of the battery protection control.
Figure 13:
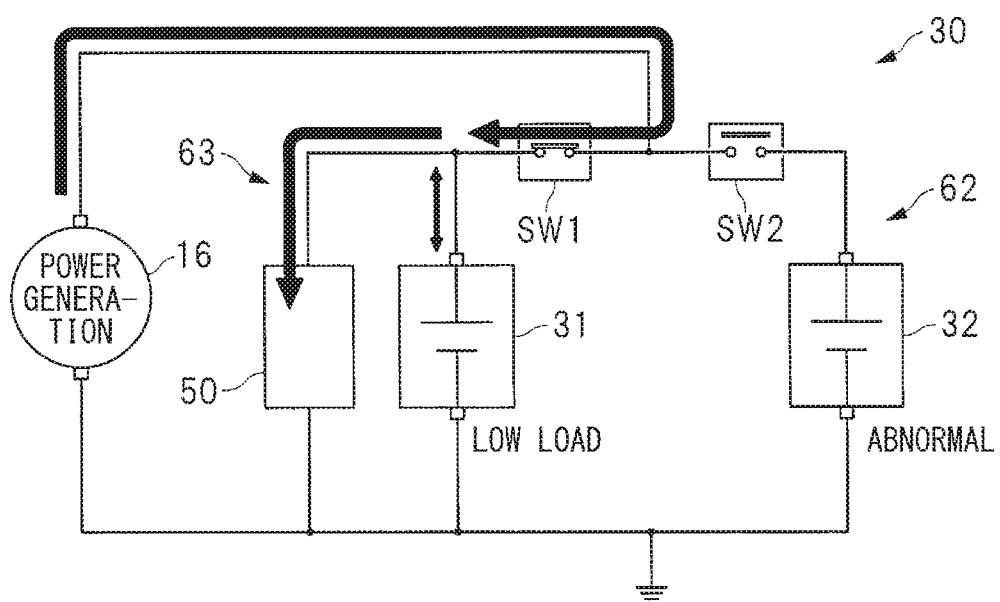
FIG. 13 describes an example of an electric power supply situation in a course of the battery protection control.

In other words, referring to FIG. 11, the power-generation command may be outputted to the starter generator 16 with the cutoff state of the switch SW1 being continued, following which, referring to FIG. 12, the switch SW1 may be switched from the cutoff state to the electrically conductive state. Thus, it is possible to supply the electric power to the electrical load group 50 from the starter generator 16 as indicated by black arrows in FIG. 12, making it possible to prevent the excessive discharge of the lead battery 31 and thereby protect the lead battery 31. Further, referring to FIG. 13, the switch SW2 may be switched from the electrically conductive state to the cutoff state. Thus, it is possible to isolate the lithium-ion battery 32 in the abnormal state from the power supply circuit 30, making it possible to increase reliability of the vehicle power supply apparatus 10.

In the foregoing example implementation, the switch SW1 is switched from the cutoff state to the electrically conductive state in a situation where the lead battery 31 discharges beyond the threshold, on a condition that the switch SW1 is switched to the cutoff state in accordance with the powering control of the starter generator 16 and the lithium-ion battery 32 is determined as being in the normal state. Hence, it is possible to supply the electric power from the lithium-ion battery 32 that is in the normal state and prevent the excessive discharge of the lead battery 31.

In the foregoing example implementation, the cutoff state of the switch SW1 is maintained in the situation where the lead battery 31 discharges beyond the threshold, on a condition that the switch SW1 is switched to the cutoff state in accordance with the powering control of the starter generator 16 and the lithium-ion battery 32 is determined as being in the abnormal state. Hence, it is possible to avoid the discharge from the lead battery 31 to the starter generator 16 and prevent the excessive discharge of the lead battery 31.

Although some implementations of the technology have been described in the foregoing with reference to the accompanying drawings, the technology is by no means limited to the implementations described above. Various changes and modifications may be made to any implementation without departing from the scope of the technology. For example, in an example implementation described above, the lead battery 31 is adopted as the first electricity storage device and the lithium-ion battery 32 is adopted as the second electricity storage device; however, this is not limitative. In an alternative implementation, any other type of battery or capacitor may be adopted. Further, in an example implementation described above, the first electricity storage device and the second electricity storage device are different from each other in kind; however, this is not limitative. In an alternative implementation, the first electricity storage device and the second electricity storage device may be the same as each other in kind. In an example implementation described above, the starter generator 16 as the integrated starter generator (ISG) is adopted as a non-limiting example of a "motor generator"; however, this is not limitative. In an alternative implementation, a motor generator as a drive source of a hybrid vehicle may be adopted.

In an example implementation described above, the main controller 60 functions as the switch controller, the electricity storage device determiner, and the motor controller; however, this is not limitative. In an alternative implementation, any other controller may function as the switch controller, the electricity storage device determiner, and the motor controller. In a yet alternative implementation, the switch controller, the electricity storage device determiner, and the motor controller may be configured by a plurality of controllers. Further, in an example implementation described above, the switch SW1 and the switch SW2 are incorporated in the battery module 41; however, this is not limitative. In an alternative implementation, the switch SW1 and the switch SW2 may be provided outside the battery module 41. In an example implementation described above, the switch SW2 is provided on the positive electrode line 34 of the lithium-ion battery 32; however, this is not limitative. In an alternative implementation, as indicated by an alternate long and short dashed line in FIG. 2, the switch SW2 may be provided on the negative electrode line 38 of the lithium-ion battery 32.

In an example implementation described above, the determination is made as to whether the lead battery 31 is in the high-load discharge situation through steps S20, S22, and S23 of the flowchart illustrated in FIG. 6; however, this is not limitative. In an alternative implementation, the determination as to whether the lead battery 31 is in the high-load discharge situation may be made in accordance with any other procedure. Further, in an example implementation described above, the determination is made as to whether the lithium-ion battery 32 is in the abnormal state through steps S30, S31, and S32 of the flowchart illustrated in FIG. 7; however, this is not limitative. In an alternative implementation, the determination as to whether the lithium-ion battery 32 is in the abnormal state may be made in accordance with any other procedure.

The main controller 60, the ISG controller 23, and the battery controller 42 illustrated in FIG. 1 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60, the ISG controller 23, and the battery controller 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 60, the ISG controller 23, and the battery controller 42 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
a motor generator coupled to the engine;
a first electricity storage device able to be coupled to the motor generator;
a second electricity storage device able to be coupled to the motor generator in parallel to the first electricity storage device;
a switch switchable between a first electrically conductive state that allows the motor generator and the first electricity storage device to be coupled to each other and a first cutoff state that allows the motor generator and the first electricity storage device to be isolated from each other;
a switch controller configured to cause the switch to be switched from the first electrically conductive state to the first cutoff state when the motor generator is controlled into a powering state;
an electricity storage device determiner configured to determine whether the second electricity storage device is in a normal state in which the second electricity storage device is able to discharge normally or in an abnormal state in which the second electricity storage device is unable to discharge normally; and
a motor controller configured to control the motor generator, the switch controller causing the switch to be switched from the first cutoff state to the first electrically conductive state in a situation where the first electricity storage device discharges beyond a threshold, on a condition that the switch is switched to the first cutoff state in accordance with the controlling of the motor generator into the powering state and the second electricity storage device is determined by the electricity storage device determiner as being in the normal state, and the switch controller causing the first cutoff state of the switch to be maintained in the situation where the first electricity storage device discharges beyond the threshold, on a condition that the switch is switched to the first cutoff state in accordance with the controlling of the motor generator into the powering state and the second electricity storage device is determined by the electricity storage device determiner as being in the abnormal state, and the motor controller switching the motor generator from the powering state to a power-generation state on a condition that the second electricity storage device is determined by the electricity storage device determiner as being in the abnormal state and the first cutoff state of the switch is thereby maintained by the switch controller.

2. The vehicle power supply apparatus according to claim 1, further comprising:
a first switch as the switch; and
a second switch switchable between a second electrically conductive state that allows the motor generator and the second electricity storage device to be coupled to each other and a second cutoff state that allows the motor generator and the second electricity storage device to be isolated from each other, wherein
the switch controller causes the second switch to be switched from the second electrically conductive state to the second cutoff state on a condition that the second electricity storage device is determined by the electricity storage device determiner as being in the abnormal state and the first cutoff state of the first switch is thereby maintained by the switch controller.

3. The vehicle power supply apparatus according to claim 2, wherein the electricity storage device determiner:
determines that the second electricity storage device is in the normal state when a discharge current of the second electricity storage device is equal to or greater than a current threshold, in a situation in which the motor generator is controlled into the powering state; and
determines that the second electricity storage device is in the abnormal state when the discharge current of the second electricity storage device is less than the current threshold, in the situation in which the motor generator is controlled into the powering state.

4. The vehicle power supply apparatus according to claim 2, wherein the electricity storage device determiner:
determines that the second electricity storage device is in the normal state when a state of charge of the second electricity storage device exceeds an electricity storage threshold; and
determines that the second electricity storage device is in the abnormal state when the state of charge of the second electricity storage device falls below the electricity storage threshold.

5. The vehicle power supply apparatus according to claim 2, wherein the electricity storage device determiner:

determines that the second electricity storage device is in the normal state when internal resistance of the second electricity storage device falls below a resistance threshold; and determines that the second electricity storage device is in the abnormal state when the internal resistance of the second electricity storage device exceeds the resistance threshold.

6. The vehicle power supply apparatus according to claim 2, wherein the situation where the first electricity storage device discharges beyond the threshold comprises one or more of:

a situation where a discharge current of the first electricity storage device exceeds a current threshold;

a situation where a terminal voltage of the first electricity storage device falls below a voltage threshold; and a situation where a large-capacity load coupled to the first electricity storage device is in operation.

7. The vehicle power supply apparatus according to claim 1, wherein the electricity storage device determiner:

determines that the second electricity storage device is in the normal state when a discharge current of the second electricity storage device is equal to or greater than a current threshold, in a situation in which the motor generator is controlled into the powering state; and determines that the second electricity storage device is in the abnormal state when the discharge current of the second electricity storage device is less than the current threshold, in the situation in which the motor generator is controlled into the powering state.

8. The vehicle power supply apparatus according to claim 1, wherein the electricity storage device determiner:

determines that the second electricity storage device is in the normal state when a state of charge of the second electricity storage device exceeds an electricity storage threshold; and determines that the second electricity storage device is in the abnormal state when the state of charge of the second electricity storage device falls below the electricity storage threshold.

9. The vehicle power supply apparatus according to claim 1, wherein the electricity storage device determiner:

determines that the second electricity storage device is in the normal state when internal resistance of the second electricity storage device falls below a resistance threshold; and determines that the second electricity storage device is in the abnormal state when the internal resistance of the second electricity storage device exceeds the resistance threshold.

10. The vehicle power supply apparatus according to claim 1, wherein the situation where the first electricity storage device discharges beyond the threshold comprises one or more of:

a situation where a discharge current of the first electricity storage device exceeds a current threshold;

a situation where a terminal voltage of the first electricity storage device fails below a voltage threshold; and a situation where a large-capacity load coupled to the first electricity storage device is in operation.

11. A vehicle power supply apparatus to be mounted on a vehicle that includes an engine, the vehicle power supply apparatus comprising:

a motor generator coupled to the engine;

a first electricity storage device able to be coupled to the motor generator;

a second electricity storage device able to be coupled to the motor generator in parallel to the first electricity storage device;

a switch switchable between a first electrically conductive state that allows the motor generator and the first electricity storage device to be coupled to each other and a first cutoff state that allows the motor generator and the first electricity storage device to be isolated from each other; and circuitry configured to cause the switch to be switched from the first electrically conductive state to the first cutoff state when the motor generator is controlled into a powering state, determine whether the second electricity storage device is in a normal state in which the second electricity storage device is able to discharge normally or in an abnormal state in which the second electricity storage device is unable to discharge normally, cause the switch to be switched from the first cutoff state to the first electrically conductive state in a situation where the first electricity storage device discharges beyond a threshold, on a condition that the switch is switched to the first cutoff state in accordance with the controlling of the motor generator into the powering state and the second electricity storage device is determined as being in the normal state, cause the first cutoff state of the switch to be maintained in the situation where the first electricity storage device discharges beyond the threshold, on a condition that the switch is switched to the first cutoff state in accordance with the controlling of the motor generator into the powering state and the second electricity storage device is determined as being in the abnormal state, and switch the motor generator from the powering state to a power-generation state on a condition that the second electricity storage device is determined by the electricity storage device determiner as being in the abnormal state and the first cutoff state of the switch is thereby maintained by the switch controller.

* * * * *